W. KLAUS.
SLEIGH RUNNER.
APPLICATION FILED FEB. 7, 1910.
961,415.
Patented June 14, 1910.
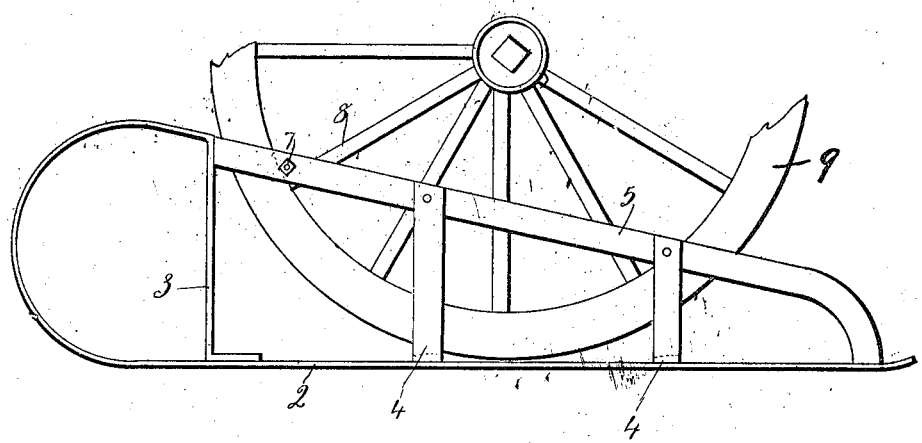
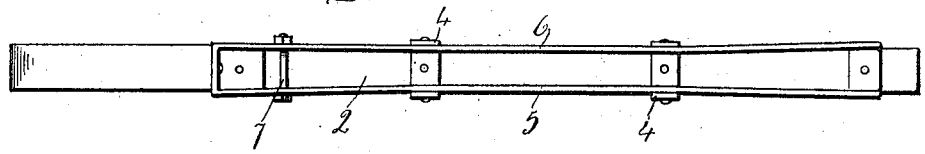

UNITED STATES PATENT OFFICE.

WILLIAM KLAUS, OF NEW HAVEN, CONNECTICUT.

SLEIGH-RUNNER.

961,415.

Specification of Letters Patent.

Patented June 14, 1910.

Application filed February 7, 1910. Serial No. 542,589.

*To all whom it may concern:*

Be it known that I, WILLIAM KLAUS, a citizen of the United States, residing at New Haven, in the county of New Haven and State of Connecticut, have invented a new and useful Improvement in Sleigh-Runners; and I do hereby declare the following, when taken in connection with the accompanying drawings and the numerals of reference marked thereon, to be a full, clear, and exact description of the same, and which said drawings constitute part of this specification, and represent, in—

Figure 1 a side view of a sleigh runner constructed in accordance with my invention and shown as applied to a vehicle wheel. Fig. 2 a top or plan view of the runner detached.

This invention relates to an improvement in sleigh runners, and particularly to a runner adapted to be applied to a vehicle wheel for use on snow or ice.

Various devices have been made to provide a wheel vehicle with runners.

The object of this invention is a simple device which may be readily applied to a wheel so that a wheel vehicle is quickly and conveniently converted into a sleigh; and the invention consists in the construction hereinafter described and particularly recited in the claims.

In carrying out my invention I employ a shoe 2 which is formed from a long strip of metal preferably curved at its outer end and turned down and secured to the runner to form a forward post 3. Secured to the shoe are two or more pairs of U-shaped posts 4 and connected with these posts are sides 5, 6, these sides being preferably formed from a single strip of metal doubled at the center where it is connected with the post 3 and the rear ends turned inward and secured to the rear end of the shoe 2. These sides are inclined and the posts 4 are of different lengths corresponding to the inclination of the sides. Preferably the sides bow inward slightly, and the distance between the sides corresponds to the width of the wheel rim to which they are to be attached, the sides having more or less spring to allow the wheel to be entered between them.

To apply the runner to a wheel, the runner is placed in front of the wheel and the wheel drawn onto the runner between the sides 5 and 6, and to hold the runner in place a bolt 7 may be inserted through the sides near the forward end to engage with one of the spokes 8 of the wheel, the rim 9 of the wheel extending between the bolt and the front post 3. In use the wheels will preferably be blocked in any desired manner.

This device may be readily formed from wrought iron or steel, is easily constructed and easily applied or removed from vehicle wheels and requires no special attachment other than the bolt referred to as the sides of the runner fit the wheel so closely as to be held in place by friction.

I claim:—

1. A sleigh-runner comprising a long shoe, posts extending upward from said shoe, and two inclined side pieces secured to said posts and to the shoe and adapted to receive a wheel between them.

2. A sleigh runner comprising a long shoe, posts extending upward from said shoe, and two inclined side pieces secured to said posts and to the shoe, said sides slightly bowed inward and adapted to receive a wheel between them.

3. A sleigh runner comprising a long shoe turned upward and rearward at its forward end, and downward into engagement with the shoe whereby a front post is formed, U-shaped posts secured to said runner, and two side pieces secured to said posts and to the runner.

In testimony whereof, I have signed this specification in the presence of two subscribing witnesses.

WILLIAM KLAUS.

Witnesses:
HENRY B. SCHWARTZ,
PAUL HUNGER.